(12) United States Patent
Mayo

(10) Patent No.: US 10,069,526 B2
(45) Date of Patent: *Sep. 4, 2018

(54) PROCESSING A NOISY ANALOGUE SIGNAL

(71) Applicant: Phasor Solutions Limited, Ledbury (GB)

(72) Inventor: Richard Hammond Mayo, Ledbury (GB)

(73) Assignee: Phasor Solutions Limited, Bromesberrow, Ledbury (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/488,130

(22) Filed: Apr. 14, 2017

(65) Prior Publication Data

US 2017/0288715 A1   Oct. 5, 2017

Related U.S. Application Data

(63) Continuation of application No. 14/423,652, filed as application No. PCT/GB2013/052235 on Aug. 23, 2013, now Pat. No. 9,628,125.

(30) Foreign Application Priority Data

Aug. 24, 2012 (GB) .................................. 1215114.8

(51) Int. Cl.
*H04B 1/16* (2006.01)
*H04B 1/10* (2006.01)
(Continued)

(52) U.S. Cl.
CPC ......... *H04B 1/1081* (2013.01); *H04L 27/227* (2013.01); *H04L 2027/0016* (2013.01); *H04L 2027/0067* (2013.01)

(58) Field of Classification Search
None
See application file for complete search history.

(56) References Cited

U.S. PATENT DOCUMENTS 3,384,895 A   5/1968   Webb
3,787,775 A   1/1974   Lanning
(Continued)

FOREIGN PATENT DOCUMENTS

EP   0987560 A1   3/2000
EP   1538698 A1   6/2005
(Continued)

OTHER PUBLICATIONS

Examination Report, GB1215114.8, search date Dec. 19, 2012 (6 sheets).
(Continued)

*Primary Examiner* — Lana N Le
(74) *Attorney, Agent, or Firm* — Reza Mollaaghababa; Thomas Engellenner; Pepper Hamilton LLP

(57) ABSTRACT

A device is provided for correlating at least one noisy analog signal which is one of a plurality of signals obtained by a plurality of receivers. The device comprises a 1-bit quantization element to which is supplied, in use, the noisy signal; a comparator configured to compare the quantized signal with a reference signal which is a consensus signal obtained by averaging data from the plurality of receivers; and an up/down counter that is configured to be incremented by a subset of the comparison signal.

17 Claims, 1 Drawing Sheet

(51) Int. Cl.
*H04L 27/227* (2006.01)
*H04L 27/00* (2006.01)

(56) References Cited

U.S. PATENT DOCUMENTS

| | | | |
|---|---|---|---|
| 3,967,279 A | 6/1976 | Zeger | |
| 4,044,396 A | 8/1977 | Haws et al. | |
| 4,117,487 A | 9/1978 | Minohara et al. | |
| 4,132,995 A | 1/1979 | Monser | |
| 4,148,031 A | 4/1979 | Tausworth et al. | |
| 4,162,499 A | 7/1979 | Jones, Jr. et al. | |
| 4,287,518 A | 9/1981 | Frosch et al. | |
| 4,387,597 A | 6/1983 | Brandestini | |
| 4,394,660 A | 7/1983 | Cohen | |
| 4,431,998 A | 2/1984 | Finken | |
| 4,675,685 A | 6/1987 | Finken | |
| 4,682,181 A | 7/1987 | Dumas et al. | |
| 4,998,181 A | 3/1991 | Haws et al. | |
| 5,126,751 A | 6/1992 | Wada et al. | |
| 5,128,689 A | 7/1992 | Wong et al. | |
| 5,184,141 A | 2/1993 | Connolly et al. | |
| 5,216,435 A | 6/1993 | Hirata et al. | |
| 5,276,455 A | 1/1994 | Fitzsimmons et al. | |
| 5,493,305 A | 2/1996 | Wooldridge | |
| 5,585,803 A | 12/1996 | Miura et al. | |
| 5,702,073 A | 12/1997 | Fluegel | |
| 5,872,815 A | 2/1999 | Strolle | |
| 5,886,671 A | 3/1999 | Riemer et al. | |
| 5,894,494 A | 4/1999 | Davidovici | |
| 6,198,445 B1 | 3/2001 | Alt et al. | |
| 6,297,775 B1 | 10/2001 | Haws et al. | |
| 6,305,463 B1 | 10/2001 | Salmonson | |
| 6,414,644 B1 | 7/2002 | Desargant et al. | |
| 6,553,083 B1 | 4/2003 | Kawai | |
| 6,714,163 B2 | 3/2004 | Navarro et al. | |
| 6,903,931 B2 | 6/2005 | McCordic et al. | |
| 6,904,104 B1 | 6/2005 | Khullar | |
| 6,961,028 B2 | 11/2005 | Joy et al. | |
| 7,092,690 B2 | 8/2006 | Zancewicz | |
| 7,132,990 B2 | 11/2006 | Stenger et al. | |
| 7,253,777 B2 | 8/2007 | Blaschke et al. | |
| 7,325,772 B1 | 2/2008 | Hanewinkel, III et al. | |
| 7,372,414 B2 | 5/2008 | Soiron et al. | |
| 7,508,338 B2 | 3/2009 | Pluymers et al. | |
| 7,786,937 B1 | 8/2010 | Stierhoff et al. | |
| 7,860,189 B2 | 12/2010 | Petilli | |
| 7,889,135 B2 | 2/2011 | Blaser et al. | |
| 7,898,810 B2 | 3/2011 | Mason et al. | |
| 8,106,823 B2 | 1/2012 | Schroth | |
| 8,279,131 B2 | 10/2012 | Puzella et al. | |
| 8,654,017 B1 | 2/2014 | Voss et al. | |
| 9,276,792 B1 | 3/2016 | Makinwa | |
| 9,362,935 B2* | 6/2016 | Chen | H03M 1/188 455/208 |
| 9,628,125 B2* | 4/2017 | Mayo | H04B 1/1081 |
| 9,654,134 B2* | 5/2017 | Popovich | H03M 1/188 455/208 |
| 2002/0135513 A1 | 9/2002 | Paschen et al. | |
| 2003/0091105 A1 | 5/2003 | Schilling | |
| 2004/0092240 A1 | 5/2004 | Hayashi | |
| 2004/0117720 A1* | 6/2004 | Choi | H03M 13/256 714/792 |
| 2005/0058227 A1* | 3/2005 | Birkett | H04L 27/22 375/329 |
| 2005/0141409 A1* | 6/2005 | Choi | H04L 1/005 370/206 |
| 2006/0046648 A1 | 3/2006 | DiFonzo et al. | |
| 2006/0097699 A1 | 5/2006 | Kamenoff | |
| 2008/0114224 A1 | 5/2008 | Bandy et al. | |
| 2008/0161660 A1 | 7/2008 | Arneson et al. | |
| 2010/0120386 A1 | 5/2010 | Konstantinos | |
| 2010/0328125 A1* | 12/2010 | Pagnanelli | H03M 3/468 341/143 |
| 2011/0146957 A1 | 6/2011 | Buchholz et al. | |
| 2012/0038525 A1 | 2/2012 | Monsalve Carcelen et al. | |
| 2013/0015988 A1* | 1/2013 | Verbruggen | H03M 1/04 341/110 |
| 2013/0039149 A1* | 2/2013 | Tenghamn | G01V 1/164 367/20 |
| 2014/0139400 A1 | 5/2014 | Voss et al. | |
| 2014/0218222 A1 | 8/2014 | Yamagata | |
| 2016/0087824 A1 | 3/2016 | Makinwa | |

FOREIGN PATENT DOCUMENTS

| | | |
|---|---|---|
| EP | 1703662 A1 | 9/2006 |
| EP | 1798809 A1 | 6/2007 |
| EP | 1819064 A2 | 8/2007 |
| EP | 1819064 A3 | 8/2007 |
| GB | 2314981 | 1/1999 |
| JP | 64015866 A | 1/1989 |
| JP | 03234128 A | 10/1991 |
| JP | 2000031874 | 1/2000 |
| WO | 2001077706 A1 | 10/2001 |
| WO | 2007080141 | 7/2007 |
| WO | 2010007442 A1 | 1/2010 |
| WO | 2010007637 A1 | 1/2010 |
| WO | 2010029125 A1 | 3/2010 |
| WO | 2011007164 A2 | 1/2011 |

OTHER PUBLICATIONS

International Search Report, PCT/GB2013/052235, dated May 26, 2014 (3 pages).
Australian Examination Report No. 1 Application No. 2009272440, dated Dec. 19, 2012 (3 sheets).
Mayo, R. "A low-cost conformal phased array satellite antenna for trains", Institution of Engineering and Technology Semninar on Broadband on Trains, Feb. 20, 2007, London, UK, Feb. 20, 2007, pp. 105-114, XP009124095 Stevenage, UK pp. 110-113.
Barrett M et al. "Adaptive Anennas for Mobile Communications". Electronics and Communication Engineering Journal, Institution of Electrical Engineers, London, GB, vol. 6, No. 4, Aug. 1,1994 pp. 203-214, XP00469556 ISSN: 0954-0695, pp. 206-207 figure 4.
International Search Report, dated Oct. 23, 2009.
International Preliminary Report, dated Jan. 18, 2011.
United Kingdom Examination Report, Application No. GB0813237.5, dated Jul. 8, 2010, pp. 1-2.
United Kingdom Notice of Allowance, Application No. GB0813237.5, dated Oct. 26, 2010, pp. 1-3.
United Kingdom Search Report, Application No. GB0813237.5, dated Apr. 23, 2009, p. 1.
United Kingdom Search Report, Application No. GB0813237.5, dated Oct. 8, 2008, pp. 1-2.
Search Report for GB1013049.0 dated Nov. 17, 2010.
Gregorwich W., "Conformal Airborne Arrays", 1997 IEEE, pp. 463-470.
Whicker, Lawrence R., et al., "RF-Wafer Scale Integration: A New Approach to Active Phased Arrays", Advanced Research Projects Agency, APMC'93, vol. 1, pp. 1-1-1-4.
Whicker Larence R., "RF-Wafer Sclae Integration: A new Approach to Active Phased Arrays+", 1998 IEEE, Session 11: WSI Applications III, pp. 291-299.
Whicker Lawrence R., "Active Phased Array Technology Using Coplanar Packaging Technology", IEE Transactions on Antennas and Propagation, vol. 43, No. 9, Sep. 1995, pp. 949-952.
McIlvenna John F. et al., "EHF Monolithic Phased Arrays—A Stepping Stone to the Future", 1998 IEEE, pp. 0731-0735.
Adler Charles O., "Two-Way Airborne Broadband Communications Using Phased Array Antennas", 2003 IEEE, vol. 2-925, pp. 1-8.
Aung Win, "Cooling Technology for Electronic Equipment", Hemisphere Publishing Corporation, 1988.
Greda L.A. et al., "An Active Phased Array for Mobile Satellite Communication at Ka-Band in LTCC Technology", Antennas and Propagation Society International Symposium, 2009. APSURSI'09. IEEE, Jun. 2009, pp. 1-4.
Greda Lukasz. A. et al., "Tx-Terminal Phased Array for Satellite Communication at Ka-band"ATENNA project under contract No. 502843.

(56) References Cited

OTHER PUBLICATIONS

Erickson Grant J. et al., "Integrated Circuit Active Phased Array Antennas for Millimeter Wave Communications Applicatons", 1994 IEEE, pp. 848-851.
Driver M. C. et al., "Wafer Scale Integration", 1989 IEEE. pp. 1-10.
Wong H. et al., "An EHF Backplate Design for Airborne Active Phased Array Antennas", 1991 IEEE, OO-2, pp. 1253-1256.
Reddick J. A. III et al., "High Density Microwave Packaging Program Phase 1—Texas Instruments/Martin Marietta Team", 1995 IEEE, TU3O-2, pp. 173-176.
Schreiner Marc et al., "Architecture and Interconnect Technologies for a Novel Conformal Active Phased Array Radar Module", 2003 IEEE, IFTU-33, pp. 567-570.
Tang Raymond et al., "Array Technology", Proceeding of the IEEE, vol. 80, No. 1, Jan. 1992, pp. 173-182.
Jones William H. et al., "Connexion by Boeingsm—Broadband Satellite Communication System for Mobile platforms", 2001 IEEE, pp. 755-758.
Kayton Myron, "One Hundred Years of Aircraft Electronics", Journal of Guidanc, Control, and Dynamics, vol. 26, No. 2, Mar.-Apr. 2003, pp. 193-211.
Zimmerman R. H., et al., "Equipment Cooling Systems for Aircraft Part I Summary of Cooling System Study" WADC Technical Report 54-359, Sep. 1954.

* cited by examiner

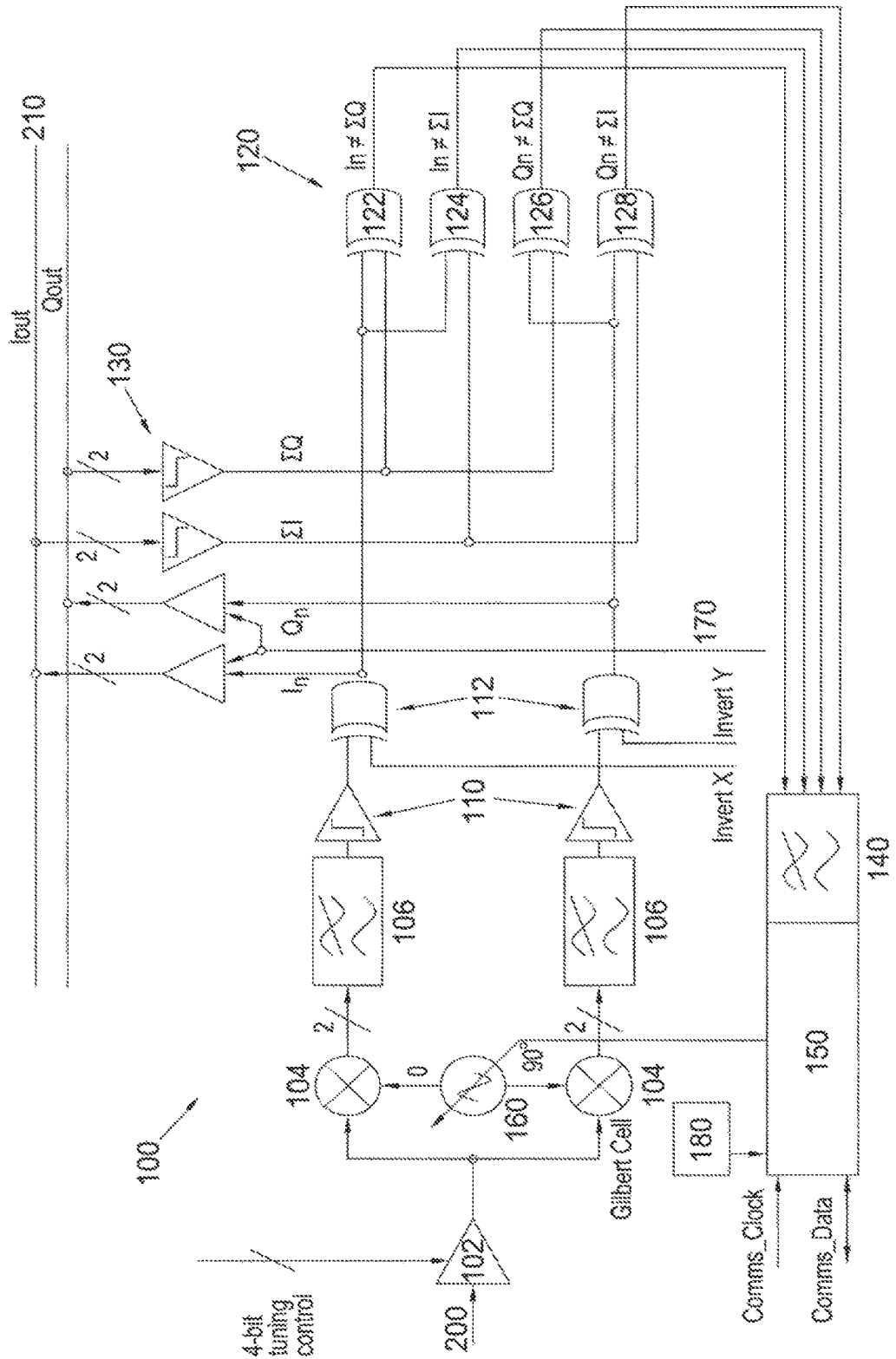

PROCESSING A NOISY ANALOGUE SIGNAL

RELATED APPLICATIONS

The present application is a continuation application of U.S. patent application Ser. No. 14/423,652, filed Feb. 24, 2015, which is a U.S. National Stage of PCT/GB2013/052235, filed Aug. 23, 2013, which claims priority to GB 1215114.8, filed Aug. 24, 2012, all of which are herein incorporated by reference in their entirety.

FIELD

The present invention relates to a method of, and a device for, correlating at least one noisy analogue signal which is one of a plurality of signals obtained by a plurality of receivers.

BACKGROUND

The correlation of one or more noisy analogue signals may be effective even when the signal is polluted by noise that is of greater amplitude than the signal. One known approach is to correlate the noisy analogue signal with another signal, such as a reference signal of known characteristics. This is achieved by multiplying together the two signals and then integrating the result. When the integral is near-zero, the signals are not correlated. When the integral is strongly positive, the signals are correlated and when the integral is strongly negative, the signals are correlated, but one is inverted in relation to the other.

However, analogue integrators are prone to drift. Furthermore, the multiplication and integration of the two signals is quite resource intensive.

The present invention has been devised in part to address these issues.

SUMMARY

According to a first aspect of the present invention there is provided a method of correlating at least one noisy analogue signal, wherein the noisy signal is one of a plurality of signals obtained by a plurality of receivers; the method comprising the steps of:
  1-bit quantising the noisy signal;
  comparing the quantised signal with a quantised reference signal, wherein the reference signal is a consensus signal obtained by averaging data from the plurality of receivers; and
  sampling the comparison signal (in other words a signal resulting from the comparing step) to increment an up/down counter.

When working with a very noisy signal, digitising the signal using 1-bit quantisation extracts the majority of the available information from the noisy signal. The presence of a lot of noise means that the provision of additional resolution in the digital signal would not add any further information.

The step of sampling the comparison signal to increment an up/down counter, effectively performs the integration required to identify the correlation, or lack thereof, between the signals. The use of an up/down counter, in place of the integrator required in the analogue approach known in the art, provides a much less computationally intensive operation, by merely adding rather than performing an integration.

The presence of a large amount of random noise affects the value of the count proportional to the signal-to-noise ratio of the noisy signal. The strength of the required signal can be measured and optimised even when the noise is much stronger.

Noise contributed by each receiver is generally independently from noise contributed by the other receivers. Thus, correlating the signals in this way can reduce the noise associated with the reference or consensus signal.

Each of the plurality of signals may originate from a single source. The signal from the source may be an n-state phase-shift keyed signal.

The method may comprise: identifying, i.e. determining, the phase offset between the phase of the noisy signal and the phase of the reference signal by considering the value of the up/down counter; and altering the phase of the noisy signal to correct for the phase offset.

The method may comprise: 1-bit quantising each of in-phase and quadrature components of the noisy signal; comparing each of the quantised in-phase and quadrature components of the noisy signal with each of quantised in-phase and quadrature components of the reference signal; if the quantised in-phase components of the noisy signal and the reference signal are equal, incrementing or decrementing a first up/down counter in a first direction (e.g. up) and, if not, incrementing or decrementing the first up/down counter in a second direction (e.g. down); if the quantised quadrature components of the noisy signal and the reference signal are equal, incrementing or decrementing the first up/down counter in the first direction and, if not, incrementing or decrementing the first up/down counter in the second direction; if the quantised in-phase component of the noisy signal and the quantised quadrature component of the reference signal are equal, incrementing or decrementing a second up/down counter in a first direction and, if not, incrementing or decrementing the second up/down counter in a second direction; and if the quantised quadrature component of the noisy signal and the quantised in-phase component of the reference signal are equal, incrementing or decrementing the second up/down counter in the second direction and, if not, incrementing or decrementing the second up/down counter in the first direction.

The method may comprise stopping the first and second up/down counters when one of the first and second up/down counters reaches full scale.

The method may comprise: determining the phase offset between the phase of the noisy signal and the phase of the reference signal by considering the values of the first and second up/down counters; altering the phase of the noisy signal in order to correct for the phase offset; and resetting the first and second up/down counters.

The method may comprise inverting the quantised signal if there is a strong negative correlation.

The method may comprise excluding the noisy signal from the consensus signal if the noisy signal consistently sits beyond a predetermined range of the consensus signal.

According to a second aspect of the present invention there is provided a device for correlating at least one noisy analogue signal, wherein the noisy signal is one of a plurality of signals obtained by a plurality of receivers, the device comprising:
  a 1-bit quantisation element to which is supplied, in use, the noisy signal;
  a comparator configured to compare the quantised signal with a reference signal, wherein the reference signal is a consensus signal obtained by averaging data from the plurality of receivers; and an up/down counter that is configured to be incremented by a subset of the comparison signal (in other words a signal provided by the comparator).

The device may comprise a sampling device configured to sample the comparison signal, and the up/down counter may be configured to be incremented each time, or just after each time, the sampling device samples the comparison signal.

The comparator may be an XOR logic operator.

The device may be configured to alter the phase of the noisy analogue signal. The phase alteration of the noisy signal is performed in order to optimise the correlation.

The device may further comprise a control block configured to reset the or each up/down counter.

There may be provided apparatus comprising the plurality of receivers, each of the plurality of receivers comprising the device.

Further optional features of the present invention are specified in the dependent claims.

BRIEF DESCRIPTION OF THE DRAWINGS

Certain embodiments of the present invention are described below, by way of example only, with reference to the accompanying FIG. 1 which illustrates a device for correlating at least one noisy analogue signal.

Certain embodiments of the present invention are described below, by way of example only, with reference to the accompanying FIG. 1 which illustrates a device for correlating at least one noisy analogue signal.

DETAILED DESCRIPTION OF THE CERTAIN EMBODIMENTS

FIG. 1 shows a device 100, or phase controlled receiver, for correlating at least one noisy analogue signal 200, being a Phased Shift Keyed signal. The noisy analogue signal 200 is obtained from one of a plurality of receivers. The signal from each of the receivers is combined to provide a consensus signal 210. The consensus signal 210 has components $I_{OUT}$ and $Q_{OUT}$ that is the summation of the in-phase and quadrature components of the analogue signals received from each of the receivers.

FIG. 1 shows a device 100, or phase controlled receiver, for correlating at least one noisy analogue signal 200, being a Phased Shift Keyed signal. The noisy analogue signal 200 is obtained from one of a plurality of receivers. The signal from each of the receivers is combined to provide a consensus signal 210. The consensus signal 210 has components $I_{OUT}$ and $Q_{OUT}$ that is the summation of the in-phase and quadrature components of the analogue signals received from each of the receivers.

The noisy analogue signal 200 is provided modulated onto a microwave frequency carrier. It is introduced to low noise amplifier 102 then to multipliers 104 which brings the signal back to baseband. The signal is then filtered at filter 106 which removes signals outside the baseband frequency band.

Once the noisy signal 200 has been prepared, it can then be digitised in the 1-bit quantisation elements 110. Similar 1-bit quantisation elements 130 are provided to digitise the consensus signal 210. The elements 110, 130 identify whether or not the signal exceeds a predetermined level and allocate a binary value as appropriate. The noisy signal 200 is then provided to an XOR gate which has its other input controlled in order to either maintain or invert the signal.

The provision of the XOR gates enables a strongly negative correlation to be inverted to provide a strongly positive correlation or vice versa.

A comparator 120 is provided to compare the prepared, and potentially inverted, noisy signal 200 (In, Qn) with the consensus signal 210 (ΣI, ΣQ). The comparator 120 comprises four XOR gates 122, 124, 126 and 128. XOR gates 124 and 126 give correlation of the amplitude of the signal. Whilst XOR gates 122 and 128 give correlation of the phase of the signal.

The outputs of the four XOR gates control the UP/DOWN status of a counter block 140 which is clocked at intervals as frequent as is justified by the frequency bandwidth of the signal being received. There is a counter that gives the amplitude of correlation and a counter that gives the phase error. The counter that gives the amplitude of correlation is incremented or decremented according to:

If In=ΣI count up
If Qn=ΣQ count up
If In≠ΣI count down
If Qn≠ΣQ count down

The counter that gives the phase error is incremented or decremented according to:

If In=ΣQ count up
If In≠ΣQ count down
If Qn=ΣI count down
If Qn≠ΣI count up

When one of the counters reaches full scale, either positive or negative, counting is stopped on the counters. By considering the value of the counters, the phase offset can be identified and the control block 150 is configured to control an oscillator 160 which alters the phase of the signal in the multipliers 104 in order to correct the phase. A signal from the control block 150 resets the counters, i.e. to their mid range zero position. Another reading may be then commenced. Accordingly, the phase offset is driven to zero.

The phase offset is equal to an angle defined by the values of the counters. In particular, if the value (hereinafter referred to as the "phase counter value") of the counter that gives the phase error is plotted on the x-axis and the value of the counter that gives the amplitude of correlation (hereinafter referred to as the "amplitude counter value") is plotted on the y-axis, then the phase error is defined as the angle between the (vertical) line which is the positive part of the y-axis and the line from the origin to the point whose x- and y-coordinates are defined by the phase counter value and amplitude counter value respectively. The angle is defined such that is can vary between −180 degrees (minus 180 degrees) and +180 degrees (plus 180 degrees). The angle is negative if the phase counter value is negative and vice versa. Accordingly, the angle is given by the arctangent of the ratio of the phase counter value to the (full-scale) amplitude counter value for angles between −45 degrees and +45 degrees, by 90 degrees minus the arctangent of the ratio of the amplitude counter value to the (full-scale) phase counter value for angles between +45 degrees and +135 degrees, etc.

It is not necessary to determine the phase offset when one of the counters has reached full scale. The phase offset can be determined from any pair of phase and amplitude counter values.

In order to preserve the integrity of the consensus signal 210, one or more of the receivers, or parts thereof, may have to be disregarded. This is achieved using a control circuit 170.

Signals from receivers can only be included in the consensus signal if they are within a predetermined percentage of the consensus signal. If the noisy signal 200 consistently sits beyond the predetermined range, despite inverting the signal with the XOR gates 112 and changing the phase by up to 90° using the oscillator 160 then the control circuit 170 can exclude it from the consensus signal. This enhances the integrity of the consensus signal.

The control block 150 is also provided with a power on reset facility 180 which ensures that the up/down counters are all reset to their midrange zero point when the device 100 is initialised.

It will be appreciated that many other modifications may be made to the embodiments hereinbefore described.

The invention claimed is:

1. A method of correlating at least one noisy analog signal, wherein the at least one noisy analog signal is one of a plurality of signals obtained by a plurality of receivers; the method comprising steps of:
   1-bit quantising the at least one noisy analog signal to extract a 1-bit quantised noisy analog signal;
   comparing the 1-bit quantised noisy analog signal with a quantised reference signal to result in a comparison signal, wherein the quantised reference signal is a consensus signal obtained by averaging data from the plurality of receivers; and
   sampling the comparison signal to increment an up/down counter to identify correlation or a lack of correlation.

2. The method according to claim 1, comprising:
   1-bit quantising each of in-phase and quadrature components of the at least one noisy analog signal;
   comparing each of the quantised in-phase and quadrature components of the at least one noisy analog signal with each of quantised in-phase and quadrature components of the quantised reference signal;
   if the quantised in-phase components of the at least one noisy analog signal and the quantised reference signal are equal, incrementing or decrementing a first up/down counter in a first direction and, if not, incrementing or decrementing the first up/down counter in a second direction;
   if the quantised quadrature components of the at least one noisy analog signal and the quantised reference signal are equal, incrementing or decrementing the first up/down counter in the first direction and, if not, incrementing or decrementing the first up/down counter in the second direction;
   if the quantised in-phase component of the at least one noisy analog signal and the quantised quadrature component of the quantised reference signal are equal, incrementing or decrementing a second up/down counter in a first direction and, if not, incrementing or decrementing the second up/down counter in a second direction; and
   if the quantised quadrature component of the at least one noisy analog signal and the quantised in-phase component of the quantised reference signal are equal, incrementing or decrementing the second up/down counter in the second direction and, if not, incrementing or decrementing the second up/down counter in the first direction.

3. The method according to claim 2, comprising:
   stopping the first and second up/down counters when one of the first and second up/down counters reaches full scale.

4. The method according to claim 2, comprising:
   determining a phase offset between a phase of the 1-bit quantised noisy analog signal and the phase of the quantised reference signal by considering the values of the first and second up/down counters;
   altering the phase of the 1-bit quantised noisy analog signal in order to correct for the phase offset; and
   resetting the first and second up/down counters.

5. The method according to claim 1, comprising inverting the 1-bit quantised noisy analog signal if there is a strong negative correlation.

6. The method according to claim 1, comprising excluding the 1-bit quantised noisy analog signal from the consensus signal if the 1-bit quantised noisy analog signal consistently sits beyond a predetermined range of the consensus signal.

7. A device for correlating at least one noisy analog signal, wherein the at least one noisy analog signal is one of a plurality of signals obtained by a plurality of receivers, the device comprising:
   a 1-bit quantisation element for receiving the at least one noisy analog signal to extract a 1-bit quantised noisy analog signal;
   a comparator configured to compare the 1-bit quantised noisy analog signal with a quantised reference signal to result in a comparison signal, wherein the quantised reference signal is a noisy signal and is a consensus signal obtained by averaging data from the plurality of receivers; and
   an up/down counter that is configured to be incremented by a subset of the comparison signal to identify correlation or a lack of correlation.

8. The device according to claim 7, further comprising a sampling device, wherein the sampling device samples the comparison signal, and wherein the up/down counter increments each time that the sampling device samples the comparison signal.

9. The device according to claim 7, comprising an oscillator configured to modify a phase of the 1-bit quantised noisy analog signal.

10. The device according to claim 7, wherein the comparator is an XOR gate.

11. The device according to claim 7, wherein:
    the 1-bit quantisation element is configured to receive the at least one noisy analog signal and to extract a 1-bit quantised noisy analog signal for each of in-phase and quadrature components of the at least one noisy analog signal;
    the comparator is configured to compare each of the quantised in-phase and quadrature components of the at least one noisy analog signal with each of quantised in-phase and quadrature components of the quantised reference signal; and
    the device comprises first and second up/down counters, wherein:
    if the quantised in-phase components of the at least one noisy analog signal and the quantised reference signal are equal, the first up/down counter is configured to be incremented or decremented in a first direction and, if not, the first up/down counter is configured to be incremented or decremented in a second direction;
    if the quantised quadrature components of the at least one noisy analog signal and the quantised reference signal are equal, the first up/down counter is configured to be incremented or decremented in the first direction and, if not, the first up/down counter is configured to be incremented or decremented in the second direction;
    if the quantised in-phase component of the at least one noisy analog signal and the quantised quadrature component of the quantised reference signal are equal, the second up/down counter is configured to be incremented or decremented in a first direction and, if not, the second up/down counter is configured to be incremented or decremented in a second direction; and if the quantised quadrature component of the at least one noisy analog signal and the quantised in-phase component of the quantised reference signal are equal, the second up/down counter is configured to be incremented or decremented in the second direction and, if not, the second up/down counter is configured to be incremented or decremented in the first direction.

12. The device according to claim 11, wherein:
the first and second up/down counters are configured to be stopped when one of the first and second up/down counters reaches full scale.

13. The device according to claim 11, wherein:
the device is configured to determine a phase offset between a phase of the 1-bit quantised noisy analog signal and a phase of the quantised reference signal from the values of the first and second up/down counters and
the device comprises:

a control block for receiving the identified correlation or lack of correlation and
an oscillator which alters the phase of the 1-bit quantised noisy analog signal in order to correct for the phase offset determined from the control block.

14. The device according to claim 7, comprising a control block having a power on reset facility configured to reset the or each up/down counter.

15. The device according to claim 7, comprising an inverting element comprising at least one XOR gate configured to invert the 1-bit quantised noisy analog signal if there is a strong negative correlation.

16. The device according to claim 7, comprising a control circuit configured to exclude the at least one noisy analog signal from the consensus signal if the at least one noisy analog signal consistently sits beyond a predetermined range of the consensus signal.

17. Apparatus comprising the plurality of receivers, each of the plurality of receivers comprising the device according to claim 7.

* * * * *